US012701446B2

(12) United States Patent
Ping et al.

(10) Patent No.: US 12,701,446 B2
(45) Date of Patent: Aug. 4, 2026

(54) NETWORK SLICING PERFORMANCE MONITORING AND ISOLATION ANALYSIS

(71) Applicant: Nokia Technologies Oy, Espoo (FI)

(72) Inventors: Jing Ping, Chengdu (CN); Iris Adam, Munich (DE); Chaitanya Aggarwal, Munich (DE); Konstantinos Samdanis, Munich (DE)

(73) Assignee: Nokia Technologies Oy, Espoo (FI)

( * ) Notice: Subject to any disclaimer, the term of this patent is extended or adjusted under 35 U.S.C. 154(b) by 322 days.

(21) Appl. No.: 18/559,668

(22) PCT Filed: May 21, 2021

(86) PCT No.: PCT/CN2021/095312
§ 371 (c)(1),
(2) Date: Nov. 8, 2023

(87) PCT Pub. No.: WO2022/241787
PCT Pub. Date: Nov. 24, 2022

(65) Prior Publication Data
US 2024/0236733 A1     Jul. 11, 2024

(51) Int. Cl.
| | |
|---|---|
| *H04W 24/08* | (2009.01) |
| *H04L 41/0853* | (2022.01) |
| *H04L 43/06* | (2022.01) |
| *H04L 43/20* | (2022.01) |
| *H04W 24/02* | (2009.01) |
(Continued)

(52) U.S. Cl.
CPC ......... *H04W 24/08* (2013.01); *H04L 41/0853* (2013.01); *H04L 43/06* (2013.01); *H04L 43/20*

(2022.05); *H04W 24/02* (2013.01); *H04L 41/0627* (2013.01); *H04L 41/0654* (2013.01)

(58) Field of Classification Search
CPC .. H04W 24/08; H04W 24/02; H04L 41/0654; H04L 41/0853; H04L 43/06; H04L 43/20; H04L 41/0627
See application file for complete search history.

(56) References Cited

U.S. PATENT DOCUMENTS

| | | | |
|---|---|---|---|
| 2019/0150081 A1* | 5/2019 | Qiao | H04W 48/16 370/329 |
| 2021/0021494 A1* | 1/2021 | Yao | H04L 41/0631 |
(Continued)

FOREIGN PATENT DOCUMENTS

| | | |
|---|---|---|
| CN | 109429244 A | 3/2019 |
| CN | 109845303 A | 6/2019 |
(Continued)

OTHER PUBLICATIONS

"3rd Generation Partnership Project; Technical Specification Group Services and System Aspects; Management and orchestration; Management Data Analytics (MDA) (Release 17)", 3GPP TS 28.104, V0.0.0, Apr. 2021, pp. 1-7.
(Continued)

*Primary Examiner* — Michael A Keller
*Assistant Examiner* — Chhian (Amy) Ling
(74) *Attorney, Agent, or Firm* — Barta Jones, PLLC

(57) ABSTRACT

There is disclosed an apparatus comprising means for performing: obtaining data associated with network slice isolation performance; generating analytics information based on the data; and sending the analytics information.

11 Claims, 8 Drawing Sheets

(51) Int. Cl.

| | |
|---|---|
| *H04L 41/0604* | (2022.01) |
| *H04L 41/0654* | (2022.01) |

(56) References Cited

U.S. PATENT DOCUMENTS

| | | | | |
|---|---|---|---|---|
| 2021/0084582 | A1* | 3/2021 | Li | H04W 16/02 |
| 2021/0119879 | A1* | 4/2021 | Zhang | H04L 41/40 |
| 2021/0289436 | A1* | 9/2021 | Hu | H04L 41/5051 |
| 2022/0201482 | A1* | 6/2022 | Ferdi | H04L 9/3236 |
| 2023/0269589 | A1* | 8/2023 | Baskaran | H04W 12/037 |
| | | | | 726/6 |

FOREIGN PATENT DOCUMENTS

| | | | |
|---|---|---|---|
| CN | 110661636 | A | 1/2020 |
| CN | 111769970 | A | 10/2020 |
| WO | 2020/033697 | A1 | 2/2020 |

OTHER PUBLICATIONS

"3rd Generation Partnership Project; Technical Specification Group Services and System Aspects; Management and orchestration; Study on enhancement of Management Data Analytics (MDA) (Release 17)", 3GPP TR 28.809, V17.0.0, Mar. 2021, pp. 1-96.

"3rd Generation Partnership Project; Technical Specification Group Services and System Aspects; Management and orchestration; Fault Supervision (FS); (Release 16)", 3GPP TS 28.545, V16.1.0, Sep. 2020, pp. 1-28.

"3rd Generation Partnership Project; Technical Specification Group Services and System Aspects; Management and orchestration; 5G performance measurements (Release 17)", 3GPP TS 28.552, V17.2.1, Apr. 2021, pp. 1-240.

"3rd Generation Partnership Project; Technical Specification Group Services and System Aspects; Management and orchestration; 5G Network Resource Model (NRM); Stage 2 and stage 3 (Release 17 )", 3GPP TS 28.541, V17.2.1, Apr. 2021, pp. 1-425.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.4.0, Mar. 2021, pp. 1-30.

"3rd Generation Partnership Project; Technical Specification Group Services and System Aspects; Security architecture and procedures for 5G system (Release 17)", 3GPP TS 33.501, V17.1.0, Mar. 2021, pp. 1-256.

"3rd Generation Partnership Project; Technical Specification Group Services and System Aspects; Architecture enhancements for 5G System (5GS) to support network data analytics services (Release 17)", 3GPP TS 23.288, V17.0.0, Mar. 2021, pp. 1-159.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"A Slice in Time: Slicing Security in 5G Core Networks", AdaptiveMobile Security, V1.0.0, Mar. 17, 2021, 36 pages.

"3rd Generation Partnership Project; Technical Specification Group Services and System Aspects; Procedures for the 5G System (5GS); Stage 2 (Release 17)", 3GPP TS 23.502, V17.0.0, Mar. 2021, pp. 1-646.

"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.

"3rd Generation Partnership Project; Technical Specification Group Services and System Aspects; Telecommunication management; Subscriber and equipment trace; Trace control and configuration management (Release 17)", 3GPP TS 32.422, V17.2.0, Mar. 2021, pp. 1-223.

"3rd Generation Partnership Project; Technical Specification Group Services and System Aspects; Telecommunication management; Subscriber and equipment trace; Trace data definition and management (Release 17)", 3GPP TS 32.423, V17.1.1, Apr. 2021, pp. 1-108.

International Search Report and Written Opinion received for corresponding Patent Cooperation Treaty Application No. PCT/CN2021/095312, dated Feb. 16, 2022, 8 pages.

"Key Issues considerations to support isolated and coexisted slices", SA WG2 Meeting #127, S2-183180, Agenda Item: 6.21, ZTE, Apr. 16-20, 2018, pp. 1-4.

* cited by examiner 650
654
653
652

651

NETWORK SLICING PERFORMANCE MONITORING AND ISOLATION ANALYSIS

RELATED APPLICATION

This application claims priority to PCT Application No. PCT/CN2021/095312, filed on May 21, 2021, which is incorporated herein by reference in its entirety.

FIELD

The present disclosure relates to an apparatus, method and computer program. More specifically, the present disclosure relates to, but not exclusively to, network slice isolation performance.

BACKGROUND

A communication system provides a facility communication between two or more devices such as user terminals, machine-like terminals, base stations and other access points, network functions, service producers, service consumers, and/or other devices. A communication system can be provided for example by means of a communication network and one or more compatible devices providing communication channels for carrying information between the communicating devices. Communication sessions may comprise, for example, communication of data for carrying communications for services such as voice, video, electronic mail (email), text message, multimedia, control data and/or content data and so on.

In a mobile or wireless communication system at least a part of a communications between at least two devices occurs over a wireless or radio link. Examples of wireless systems comprise public land mobile networks (PLMN), satellite-based communication systems and different wireless local networks, for example wireless local area networks (WLAN). A user can access the wider communication system via an access system means of an appropriate communication device or terminal. Non-limiting examples of communication devices are a user equipment (UE) or user device and various machine-like terminals. The wireless access can be provided by a base station of a radio access system or network (RAN). Radio access systems provide local coverage areas and are connected via an appropriate transport system to a larger communication system, known as the core network.

The core network comprises a wide variety of entities providing various functions and services. Similar functions and/or services may be provided by different entities in separate locations and/or by distributed data processing. At least some of the functions and/or services may be provided by virtual data processing instances. Providing data communications between the accessing devices and the service providing entities such as application functions can involve intermediate and otherwise associated entities, processes and functions.

A management system comprises a wide variety of entities providing various management services, e.g. provisioning, configuration, performance monitoring, fault supervision, security management and analytics, and so on.

The communication system, services, functions and devices typically operate in accordance with a given standard or specification which sets out what the various entities associated with the system are permitted to do and how that should be achieved. Communication protocols and/or parameters which shall be used for the connection are also typically defined. Non-limiting examples of communication systems include those based on fifth generation (5G) networks standardized by the 3rd Generation Partnership Project (3GPP).

A feature of modern communication systems is known as network slicing. Network slicing is a feature that enables multiplexing of virtualized and/or independent logical networks on a physical network infrastructure. A sliced network can comprise a set of logical networks on top of a shared infrastructure. Each logical network is designed to serve a defined purpose and comprises all required network resources, configured and connected end-to-end. Each network slice can be understood as an isolated end-to-end network tailored to fulfil diverse requirements requested by a particular application. Each network slice can be administrated by a network operator. Further, a network slice of one operator can be offered to another operator to build another network slice. Operators can define the specific characteristics of a slice, for example speed, latency, reliability, and security. Different slices can be required by different functions. For example, some services require a low latency and very reliable slice whereas others may require higher bandwidth but would have less need for low latency.

The network operator can be a mobile network operator or a virtual mobile network operator. Network slicing can be supported in mobile networks designed to efficiently embrace a plethora of services which can have very different service level requirements. The infrastructure provider, i.e., the owner of the underlying telecommunication infrastructure can lease its physical resources to mobile operators. In addition, an operator, acting as a network slice provider, can lease its network slice to other mobile operators. According to the availability of the assigned resources, a mobile operator can autonomously deploy multiple network slices that are customized to the various applications provided to its own users.

SUMMARY

In accordance with an aspect there is provided an apparatus comprising means for performing: obtaining data associated with network slice isolation performance; generating analytics information based on the data; and sending the analytics information.

According to some examples, the data comprises data of one or more errors.

According to some examples, the one or more errors comprise one or more messages having incorrect Single Network Slice Selection Assistance information.

According to some examples, the data comprises performance measurements.

According to some examples, the performance measurements are associated with one or more signalling failures caused by use of incorrect Single Network Slice Selection Assistance information.

According to some examples, the data comprises information of any one or more of: isolation assurance related report from an analytics function; network topology information; configuration parameters related to isolation; version/release information of one or more network functions.

According to some examples, the means are further configured to perform obtaining the data associated with network slice isolation performance from any one or more of: a network function; a network repository function; a security function; an analytics function; a management function.

According to some examples, the means are further configured to perform requesting the data associated with network slice isolation performance in response to one or more alerts.

According to some examples, the means are further configured to perform correlating the data associated with network slice isolation performance with isolation policy information.

According to some examples, the means are further configured to perform obtaining the isolation policy information from an isolation policy database.

According to some examples, the means are further configured to perform including one or more of the following with the sent analytics information: isolation policy violation statistics; information of probable cause of isolation policy violation; one or more recommended mitigation steps for mitigating future violation of the isolation policy; an identifier which indicates a type of violation; performance statistics; performance prediction information; information of whether the analytics information pertains to a shared or dedicated resource; information of a target entity to which the analytics information is to be sent; geographical location information; information of one or more affected objects; a start and/or stop time of any performance problems; a severity level of any performance problems.

According to some examples, the means are further configured to perform sending the analytics information to an analytics consumer.

According to some examples, the apparatus comprises a network data analytics function.

According to some examples, the apparatus comprises a management data analytics function.

According to some examples, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: obtaining data associated with network slice isolation performance; generating analytics information based on the data; and sending the analytics information.

According to a third aspect there is provided an apparatus comprising: circuitry for obtaining data associated with network slice isolation performance; circuitry for generating analytics information based on the data; and circuitry for sending the analytics information.

According to a fourth aspect there is provided a method comprising: obtaining data associated with network slice isolation performance; generating analytics information based on the data; and sending the analytics information.

According to some examples, the data comprises data of one or more errors.

According to some examples, the one or more errors comprise one or more messages having incorrect Single Network Slice Selection Assistance information.

According to some examples, the data comprises performance measurements.

According to some examples, the performance measurements are associated with one or more signalling failures caused by use of incorrect Single Network Slice Selection Assistance information.

According to some examples, the data comprises information of any one or more of: isolation assurance related report from an analytics function; network topology information; configuration parameters related to isolation; version/release information of one or more network functions.

According to some examples, the method comprises obtaining the data associated with network slice isolation performance from any one or more of: a network function; a network repository function; a security function; an analytics function; a management function.

According to some examples, the method comprises requesting the data associated with network slice isolation performance in response to one or more alerts.

According to some examples, the method comprises correlating the data associated with network slice isolation performance with isolation policy information.

According to some examples, the method comprises obtaining the isolation policy information from an isolation policy database.

According to some examples, the method comprises including one or more of the following with the sent analytics information: isolation policy violation statistics; information of probable cause of isolation policy violation; one or more recommended mitigation steps for mitigating future violation of the isolation policy; an identifier which indicates a type of violation; performance statistics; performance prediction information; information of whether the analytics information pertains to a shared or dedicated resource; information of a target entity to which the analytics information is to be sent; geographical location information; information of one or more affected objects; a start and/or stop time of any performance problems; a severity level of any performance problems.

According to some examples, the method comprises sending the analytics information to an analytics consumer.

According to some examples, the method is performed by a network data analytics function.

According to some examples, the method is performed by a management data analytics function.

According to a fifth aspect there is provided a computer program comprising instructions for causing an apparatus to perform at least the following: obtaining data associated with network slice isolation performance; generating analytics information based on the data; and sending the analytics information.

According to a sixth aspect there is provided a computer program comprising instructions stored thereon for performing at least the following: obtaining data associated with network slice isolation performance; generating analytics information based on the data; and sending the analytics information.

According to a seventh aspect there is provided a non-transitory computer readable medium comprising program instructions for causing an apparatus to perform at least the following: obtaining data associated with network slice isolation performance; generating analytics information based on the data; and sending the analytics information.

According to an eighth aspect there is provided a non-transitory computer readable medium comprising program instructions stored thereon for performing at least the following: obtaining data associated with network slice isolation performance; generating analytics information based on the data; and sending the analytics information.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities and useful background information to practise the invention. Although the specification may refer to "an", "one", or "some" examples or embodiment(s) in several locations of the text, this does not necessarily mean that a particular feature only applies to a single example or embodiment. Single features of different examples and embodiments may also be combined to provide other embodiments.

Figure 1:
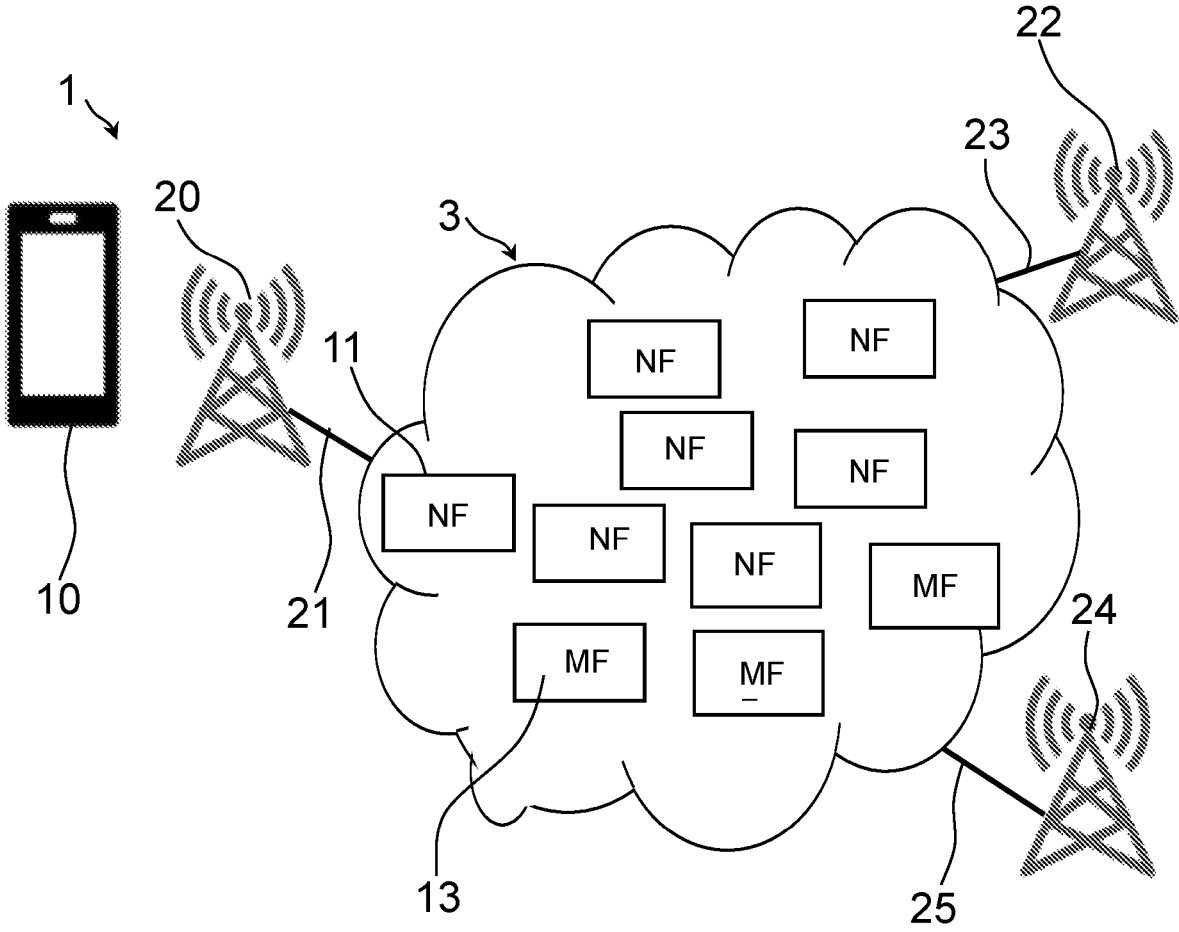
FIG. 1 illustrates a schematic example of a communication system.

An overall description of an example for a communication system is given first as background with reference to FIG. 1 where a schematic presentation of system 1 comprising radio access systems 20, 22, 24 (radio access network; RAN) and a core network (CN) system shown as cloud 3 are given. A transport system for connecting the core and the respective RAN is denoted by respective lines 21, 23 and 25. A communications device 10 can be located in the service area of one of the radio access systems and can thus communicate wirelessly with an access point (e.g. base station) provided by the system. For example, the communication device 10 may be in the service area of radio access system 20. The access system 20 can connect the device 10 to the core network 3. In some examples, the access system 20 may not be operated by a network operator the device 10 subscribes to. A large number of systems provided by a number of different operators can be comprised in the system. The technical specifications, features and capabilities of the different systems can vary substantially.

In the FIG. 1 example the radio access systems 20, 22 and 24 are schematically presented by a base station. However, it is noted that a radio access system can comprise a plurality of access points. An access point can comprise any node that can transmit/receive radio signals (e.g., a TRP, a base station such as gNB, eNB, a user device such as a UE and so forth). An example of wireless access architecture is 3GPP 5G radio access architecture. The communication device may access the Core Network via NG RAN (possibly including satellite access) or via other technologies like Untrusted Non 3GPP access to 5G core (using e.g. a N3IWF), Trusted Non 3GPP access to 5G core (using e.g. a TNGF/TWIF) or Wireline Access (using e.g. a W-AGF or AGF). However, embodiments are not limited to such an architecture.

The communications device 10 is an example of a user equipment (UE) which can request one or more services provided by service providers through the core network 3. The device 10 can be associated with a unique user identity. The user identity may be assigned to the device, to a user of the device or a subscription by a user of the device to a network operator. The device 10 may be any suitable communications device adapted for wireless communications. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The device may be provided as part of another device. The device may receive signals over an air or radio interface via appropriate apparatus for receiving and may transmit signals via appropriate apparatus s for transmitting radio signals. The communications can occur via multiple paths. Multiple input multiple output (MIMO) type communications may be provided with multiantenna elements.

The wider communication system, or core network (CN) 3 can comprise a 5G core network (5GC) and entities providing one or more interconnected network functions (NF). The system can comprise one or more data networks (DN). In FIG. 1 blocks 11 denote various possible network functions. The non-liming and non-exhaustive list of these NFs include: an access and mobility management function (AMF); a session management function (SMF); a local PDU session anchor user plane function (L-PSA UPF); a policy control function (PCF); an application function (AF); a network repository function (NRF); and a local NEF (L-NEF). Other management, control and application functions are also possible. For example, entities providing an edge application server (EAS), a unified data management (UDM), a unified data repository (UDR) and various user plane functions may be provided. A plurality of content providers can also be provided. It shall be appreciated that at least some of the entities denoted by blocks 11 can be provided as virtual data processing instances in virtualized environment. In FIG. 1 blocks 13 denote various possible management functions (MF). One or more MFs may perform management data analytics. Each MF may perform functions for any one or more of configuration; performance; fault management, as the data used for isolation assurance related analytics are supported/collected by those MFs.

Services can be provided to the user device by means of one or more sliced networks, e.g., using resources leased by mobile operators from the owner of the underlying telecommunication infrastructure.

It's recognized by the industry that isolation is an important requirement of an end-to-end (E2E) network slice. By "isolation" is meant that one network slice will not inadvertently be affected by another network slice. GSMA defines Isolation Level (e.g., physical isolation and logical isolation) of network slice isolation in GST (Generic network Slice Template)/NEST (Network Slice Template).

E2E network slice isolation includes both traffic isolation (including control and data plane) and network resource isolation considering E2E management domains i.e. Access Network (AN), Core Network (CN) and Transport Network (TN) domains. Based on existing proposals in SA5 and on SA2 specification, a Core NF/NFService could be allocated to a specific slice/slice group, and be isolated from NFs/NF Services which are allocated to serve other network slices.

Figure 2:
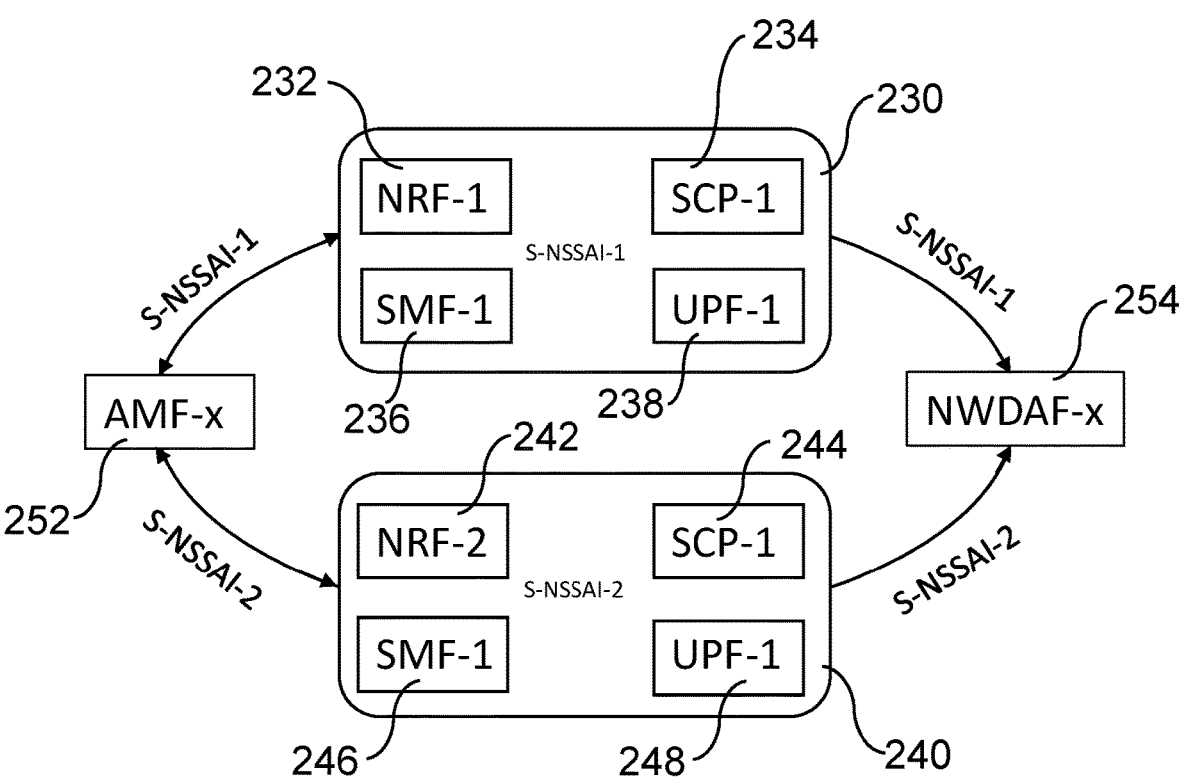
FIG. 2 schematically shows a network slice isolation example in 5GC.

With reference to FIG. 2, a first group of NFs is shown at 230, and a second group of NFs is shown at 240. First group of NFs 230 comprises a network repository function (NRF) 232; a service communications proxy (SCP) 234; a Session Management Function (SMF) 236; and a user plane function (UPF) 238. Second group of NFs 240 comprises an NRF 242; an SCP 244; an SMF 246; and a UPF 238.

Shared NFs are shown schematically at 252 and 254. In the example of FIG. 2, NF 252 comprises an AMF, and NF 254 comprises a Network Data Analytics function (NWDAF).

In the example of FIG. 2, first group of NFs 230 are allocated to support first Single Network Slice Selection Assistance Information S-NSSAI-1, and the second group of NFs 240 are allocated to support second Single Network Slice Selection Assistance Information S-NSSAI-2. NFs 252 and 254 support both network slices. Ideally, messages for S-NSSAI-1 would be sent to NFs 230 (dedicated for S-NS-SAI-1) or 252 and/or 254 (shared NFs). Ideally, messages for S-NSSAI-2 would be sent to NFs 240 (dedicated for N-SSAI-2) or 252 and/or 254 (shared NFs), and there would be no interaction or limited interaction between NFs 230 and 240 that belong to different network slices.

According to isolation requirements and policies defined for a network slice, in a normal situation, resources allocated to a network slice shall be isolated from other slices during (i) deployment time, and (ii) runtime in terms of signaling and user plane messages (i.e. control and data plane) based also on pre-configured policies. As shown in FIG. 2, ideally all signaling or user plane messages belonging to S-NS-SAI-1 should be delivered to the group 230, and all signal or user plane messages belonging to S-NSSAI-2 should be delivered to the group 240. There should be no interaction between the groups of NFs 230 and 240 according to the isolation configuration.

Figure 3:
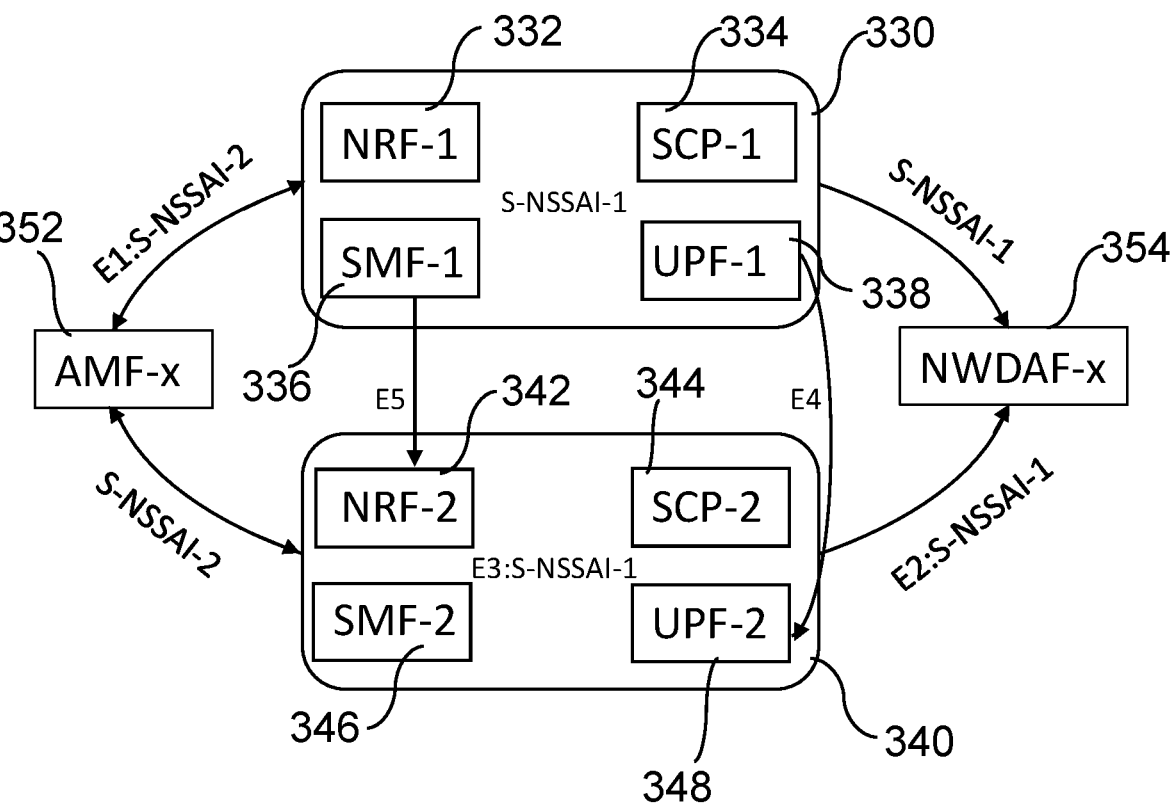
FIG. 3 schematically shows an example where network slice isolation is broken.

However, for one or more reasons, the isolation could be broken, as shown schematically in FIG. 3 which shows several examples demonstrating isolation violation incidents. By way of non-limiting example, the reason for the isolation being broken could comprise one or more of: misconfiguration on network (which may lead to misconfiguration of a NF); misconfiguration of NF or security function or other function; compromising of NF or security function or other function; implementation of older version of standard (which may have vulnerabilities) by an NF.

Some potential errors leading to isolation are schematically represented in FIG. 3 by each of E1, E2, E3, E4, E5, as explained in more detail below.

E1: S-NSSAI-2. Because of a problem on AMF 332, or on NRF-1 332 or SCP-1 334, AMF 332 may deliver message of S-NSSAI-2 to SMF-1 336 rather than SMF-2 346. In some examples, the problem may be detected by SMF-1 336.

E2: S-NSSAI-1. Because of a problem on group of NFs 340, or another problem in the network, NWDAF 354 receives S-NSSAI-1 related data from NFs 340, rather than from NFs 330. In some examples, this problem may be detected by NWDAF 354. E3: S-NSSAI-1 related message exchange between NFs in group 340, whereas S-NSSAI-2 message exchange would be expected. In some examples, the problem may be detected by the receiving NF.

E4: UPF-2 348 receives data for S-NSSAI-1 from UPF-1 338. The problem may be detected by the UPF-2 348 if it can't validate the integrity of the data. In some cases, the UPF-2 348 may not have the necessary information to take a decision i.e. to determine whether received data for S-NS-SAI-1 from UPF-1 338 is expected or not, check whether there's no integration check, or the same key (e.g. for different slices of a same UE) is used for integration check. In some examples, the problem may be detected by a security function if it's deployed, or through OAM (Operation and Management) trace, or via other probes deployed in the network.

E5: NRF-2 342 receives an unauthorized registration/discovery request from NF group 330, or some security attacker fakes to be from group 330. In some examples, which may be detected by the NRF-2 342, even if there's no S-NSSAI information in the request.

Figure 4:
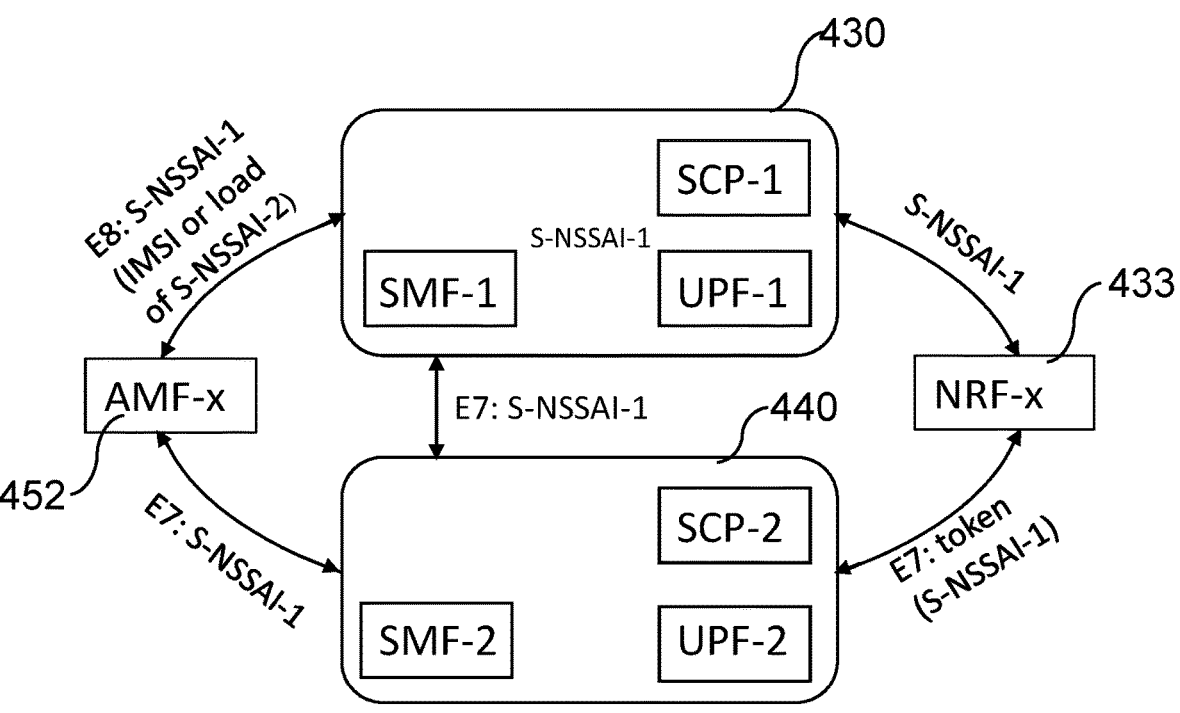
FIG. 4 schematically shows an example where network slice isolation is broken.

Furthermore, according to the report GSMA CVD-2021-0047, there are native vulnerabilities, as shown schematically by E7 and E8 in FIG. 4.

E7: An NF in group 440 may receive a token of S-NS-SAI-1 from a shared NRF 433, and access an NF service of S-NSSAI-1 from a shared AMF 452, or dedicated NFs of S-NSSAI-1 (i.e. NFs in group 430), if there's no security function deployed between the two network slices.

E8: with a token of S-NSSAI-1, an NF from group 430 could access information of UEs (including state data) which are allocated to S-NSSAI-2 from shared AMF 452, or report overload of S-NSSAI-2 to shared AMF 452.

It is identified in the present disclosure that these kinds of errors (e.g. errors E1 to E8) can cause problems for resilience. These problems may also impact availability, performance and security of related network slices.

The paper "AMS Slicing Security in 5G Core Networks Whitepaper v1.00" in GSMA CVD-2021-0047 discloses vulnerabilities of existing 3GPP specifications regarding network slice interaction, and describes an attack scenario and proposes to enhance the protocol of the signaling plane to mitigate the risk. This may be considered preventative security control. The risk could be reduced if all NFs, including NRF and SCP, implemented the enhanced signaling protocol. In other words, the method proposed in CVD-2021-0047 may be considered a preventative security control in core NFs. However, it is unlikely or impossible that the preventative security control will be able to completely prevent errors from ever occurring.

TS 28.288 documents security issues on IoT devices concentrating on abnormal communications and mobility. TR 28.809 introduces a security use case and mechanisms for NFs taking into consideration data from both 5G Core and management plane. None of the current standards are dealing with network slicing and particularly with the issue of isolation.

Therefore, and as will be discussed in more detail further below, the present application proposes a detective security control approach i.e. an approach based on detection of network slice isolation performance. For example, the performance may consider one or more errors that have occurred. In this approach, any errors that are detected can be monitored and/or dealt with. For example, error messages may be obtained or collected by a network management and/or network analytics function. For example, error messages may be collected from NFs regarding mismatch of S-NSSAI when recognized by NF. Or mismatch of S-NSSAI may be detected through trace message in management plane protocol, or from security functions (e.g. firewall (FW)) or any other probes deployed in the network. In some examples, the detection of performance may comprise obtaining performance measurements. For example, the performance measurements may relate to signaling failures. For example, the signaling failures may be caused by use of incorrect S-NSSAI. Based on the collected information and isolation policies preconfigured in management and core domains, an analytics function (AF) can determine whether isolation policies have been broken. One or more actions may then be taken to determine the root cause of the error.

The AF may then trigger remedial action during runtime. Therefore in at least some examples it may be considered that at least some of the disclosure may be implemented in an analytics function. In at least some examples, the analytics function may be comprised in the management plane.

Figure 5:
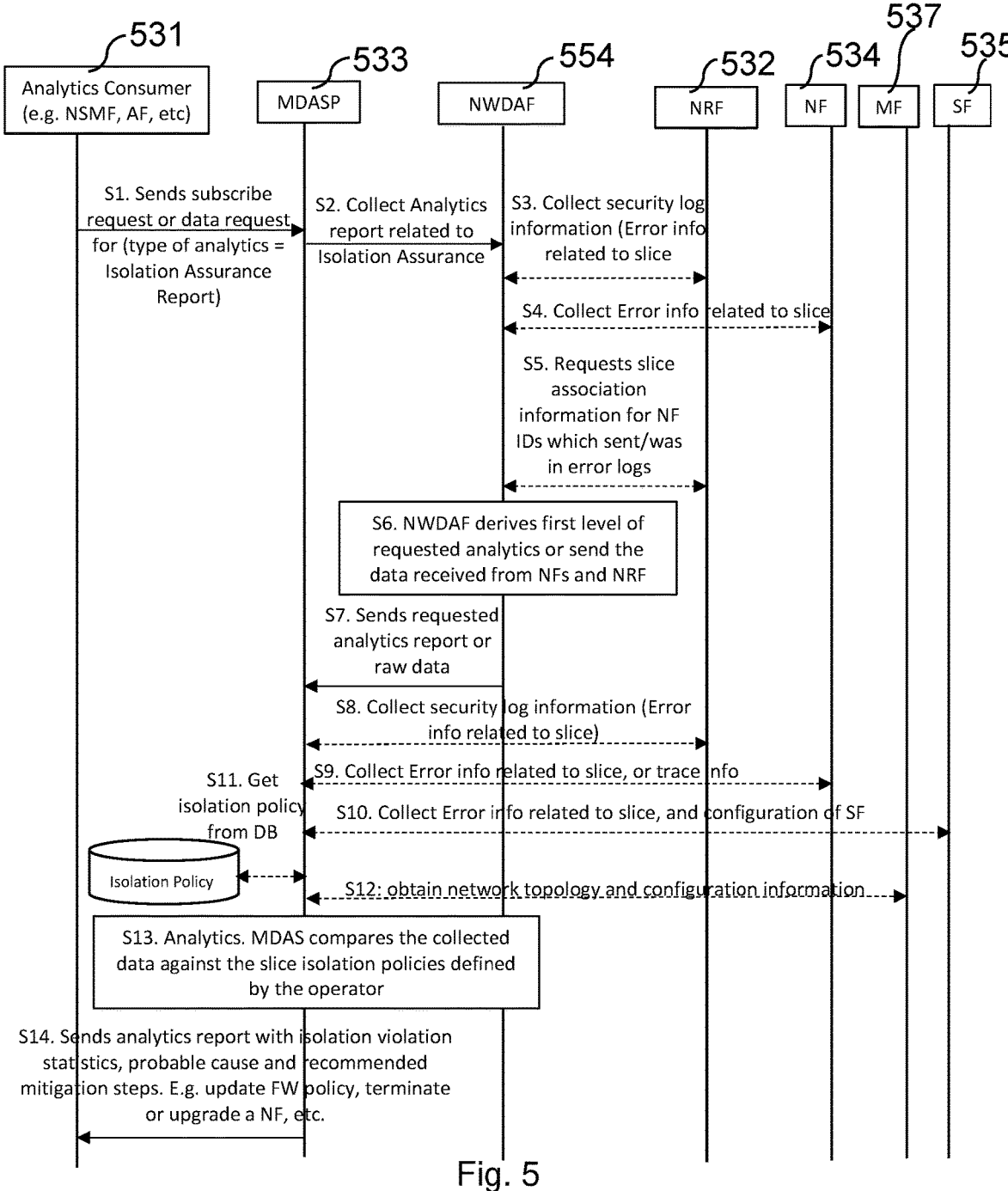
FIG. 5 is a diagram schematically showing communication according to an example of the disclosure.

An example will now be described with respect to FIG. 5. FIG. 5 shows an example set of communications between an Analytics consumer 531 (e.g. NSMF, AF), a management data analytics service producer (MDASP) 533, an NWDAF 554, an NRF 532, an NF 534, a management function (MF) 537, and a security function (SF) 535. For example, NF 534 may comprise any one or more of: SCP; SMF; UPF, AMF, AUSF, UDM, etc.

At S1, analytics consumer 531 sends a subscribe request or a data request to MDASP 533. In some examples, the subscribe request or the data request is a request for analytics information. For example, the analytics consumer 531 may request an Isolation Assurance Report. In some examples, the Isolation Assurance Report is used by the analytics consumer 531 to monitor whether the network slices are properly isolated.

At S2, MDASP 533 sends a message to NWDAF 554 to collect the analytics information. In some examples, the message sent at S2 may specifically request Isolation Assurance information.

At S3, the NWDAF 554 and the NRF 532 communicate with each other. The communication at S3 may include communication of information as to whether there have been any network slice related errors. In some examples, the slice related error information is obtained from security log information.

At S4, NWDAF 554 communicates with NF 534. At S4, the NWDAF 554 collects slice related error information from NF 534. It is to be noted that, in some examples, the error and configuration information stored in NRF 532 and NF 534 may be different. Therefore, for example, the information collected at S3 and S4 may be different.

At S5, NWDAF 554 requests slice association information from NRF 532. For example, the NWDAF 554 may request slice association information for NF IDs which were sent and/or were present in error logs (e.g. in the information collected at S3 and S4). For example, the slice association information may indicate in which slice or slices the errors have occurred.

At S6, the NWDAF 554 prepares or derives a set of analytics information, for responding to analytics consumer 531. For example, the NWDAF 554 prepares analytics information based on information collected at any one or more of S3, S4 and S5.

At S7, NWDAF 554 sends the collected analytics data to MDASP 533. In some examples, the analytics information is in the form of an analytics report which has been prepared by the NWDAF 554. In some examples, the analytics information is provided by the NWDAF 554 to the MDASP 533 in a raw form.

At S8, MDASP 533 communicates with NRF 532 to collect any slice related error information, and/or registration/discovery failure measurements. For example, the slice related error information may be obtained from security log information.

At S9, MDASP 533 communicates with NF 534 to collect any slice related error information, and/or trace information (i.e. raw signalling message as defined in 3GPP TS 32.422/3).

At S10, MDASP 533 communicates with SF 535 to collect any slice related error information. At S10, the MDASP 533 may also collect SF configuration information.

It is to be noted that as core domain analytics function, NWDAF 554 could perform preliminary analytics based on domain knowledge. MDASP 533 could perform end to end domain analytics function. In some examples, MDASP 533 has wider knowledge than NWDAF 554, but can leverage report from NWDAF 554. According to some examples, data collected on S8 and S9 comprises data collected on S3 and S4, and more. According to some examples, S5 is only collected by NWDAF 554, and S10 is only used for MDASP 533.

At S11, MDASP 533 obtains isolation policy information. In some examples, the isolation policy information is obtained from an isolation policy database. In some examples, the isolation policy information contains information pertaining to network slice isolation policy. For example, a network slice isolation policy may set-out how various functions (e.g. NFs) and their communications are to be separated between slices. In some examples, the policy is operator defined.

At S12, MDASP 533 obtains one or more of: network topology information; configuration information; performance measurements; event information; alarm information; from management function (MF) 537. In some examples, the MF 537 may comprise one or more of: a network slice management function; network slice subnet management function; network function management function; network manager; domain manager; element manager. The alarm may also be referred to as an alert or a notification.

At S13, the MDASP 533 performs analytics. For example, at S13 the MDASP 533 performs analytics based on the slice related error information that has been collected and the obtained policy information. From the analytics, the MDASP 533 can determine whether there have been any violations of the policy. In other words, at S13 the MDASP 533 correlates the obtained data associated with network slice isolation performance with isolation policy information.

At S14, the MDASP 533 sends an analytics report to the analytics consumer 531. In some examples, the analytics report is prepared by the MDASP 533. In examples, the analytics report comprises network slice isolation violation information. For example, the network slice isolation violation information may comprise network slice violation statistics. In some examples, the analytics report comprises information of probable cause of any violations. For example, the analytics report may identify one or more problematic NFs. In some examples, the analytics report may recommend one or more mitigation steps, to mitigate further incidences of the violations. For example, mitigation steps may include: upgrade one or more NFs; terminate one or more NFs; update firewall (FW) policy.

Whilst the worked example of FIG. 5 shows certain steps being carried out by certain entities, it will be appreciated that in some examples certain steps may occur at one or more different entities. For example, one or more steps being shown as carried out by NWDAF 554 may additionally or alternatively be carried out by MDASP 533, and vice versa. According to some examples, MDASP 533 is E2E/cross domain analytics with wider knowledge, while NWDAF 554 is focused on core domain.

According to some examples, the data associated with network slice isolation performance (e.g. information of one or more errors, performance measurements) is obtained in response to an alert being raised. For example, the alert may be raised by a network function that becomes aware of an error. The alert may also be referred to as an alarm or a notification.

An example table showing input data for management data analytics of network slice isolation assurance is shown in Table 1 below. For example, Table 1 shows the type of data that is to be obtained for analytics. For example, Table 1 may comprise information that is stored at MDAS.

TABLE 1

| input data for analytics | |
| --- | --- |
| Data category | Required data |
| Slice Id | S-NSSAI as per TS 23.501/23.502 |
| MDA Services | Slice related analytics: |
| | Resource utilization analysis as per clause 6.2.2 TR 28.809 |
| | Network slice load analysis as per clause 6.3.2 TR 28.809 |
| | Network slice throughput analysis as per clause 6.3.4 TR 28.809 |
| NWDAF Report | type of analytics = Isolation Assurance information in the report: violation statistics on S-NSSAIs, probable cause, impacted UEs, PDU sessions |
| Isolation policy | Isolation policies defined in E2E domain or Core management domain |
| Isolation related error report | Isolation violation related error report/alarm from functional NF (e.g. AMF, SMF, UPF, AUSF, etc.) or NRF or SCP or NSSF or NWDAF, or security function (e.g. FW, SEG, etc.), or other probes deployed in the network, or virtualization system where the NFs deployed |
| Performance Measurements (PM) | Virtualized resources/behavior: Virtual resource usage of NF: The resource usage of virtual network functions, see clause 5.7.1 of TS 28.552. Virtual NF Re-location: Timing/duration and success rate (inventive PM) Virtual NF location: NF location with respect to a data network (inventive PM) NRF (NF service discovery related measurements) as per clause 5.10.3 TS 28.552 considering network slice: Number of failed NF service register/discovery requests with wrong S-NSSAI Number of failed NF service discovery due to unauthorized NF Service consumer Number of failed NF service discoveries due to input errors with wrong S-NSSAI Authentication procedure related measurements AMF - UE authentication: Number of authentication/failed authentication rejections as per clause 5.2.11 TS 28.552 AMF/SMF/AUSF: number of unauthorized/erroneous access with wrong S-NSSAI |
| Configuration Data | NRM attributes related to network slice isolation configuration |
| Network Topology | Topology of the network including deployed security functions for network slice isolation |

Of note in Table 1 are at least the following:

The NWDAF report. This is the report that, for example, the NWDAF provides to the analytics consumer and/or the MDAF. According to some examples, the information in the report may comprise one or more of: violation statistics on S-NSSAIs; cause or probable cause of any violations; a list of one or more impacted UEs; a list of one or more impacted PDU sessions.

Isolation policy. According to some examples, the isolation policy is defined in E2E domain or core management domain.

Isolation related error report. This gives entities and/or functions a mechanism for reporting errors. In some examples, the errors are provided in a report. In some examples, errors may be reported or indicated by way of an alarm. For example, any of the following may be configured to raise an error report or alarm: functional NF (e.g. AMF, SMF, UPF, AUSF, etc.); NRF; SCP; NSSF; NWDAF; security function (e.g. FW, SEG, etc.); other probes deployed in the network or virtualization system where the NFs are deployed.

Performance measurement. Notable performance measures include:

Number of failed NF service register/discovery requests with incorrect S-NSSAI.

Number of failed NF service discoveries due to input errors with incorrect S-NSSAI.

Authentication procedure related measurements including AMF/SMF/AUSF: number of incidences of unauthorized/erroneous access with incorrect S-NSSAI.

Configuration data. For example, this may include network resource management (NRM) attributes related to network slice isolation configuration.

Network topology. This may include information of the network, for example including deployed security functions for network slice isolation.

Table 2 shows an example of fields that may be included in an analytics report. For example, the analytics report sent at S13 of FIG. 5 may take the form of the analytics report shown in Table 2.

TABLE 2

| example analytics report | |
| --- | --- |
| Information | Description |
| Security Incident Identifier | Identifier that indicates the violation of isolation policies |
| Type of Analytics | Statistics or Prediction of security or performance downgrade problem |
| Type of resource | Shared or dedicated resource |
| Reporting Target | Network Function in 5GC (fast reaction on signaling/core-plane) Orchestration related management function in management plane Administrator of operator Tenant of the network slice |
| Location | Geographical location where the problem happens and that the problem affects |
| Affected Objects | Network slice; network function; PDU session; subscriber information; management function; cloud/virtualization system manager |
| Start/Stop Time | Starts/stop time of the problem |
| Root Cause | The originator and type of the problem The originator could be NF, SF, transport function, management function, cloud/virtualization component, etc. Type of problem could be mis-configuration, mis-function, vulnerable version of software (e.g. implement old version of specification), fake NF, compromised by attack |
| Severity Level | The severity level (e.g. critical, medium, not important) of the problem |
| Recommended Actions | Recommendation actions to resolve the isolation problem: Enforce isolation policies on security gateway/FW/proxy Isolate/terminate the malicious NF Reconfigure impacted NF Upgrade/patch problem NF Re-location to hypervisor with higher security, towards different hardware server Terminate PDU session (fast reaction) |

It will be appreciated that at least some examples may introduce a novel method to identify and report potential isolation issues (for example security or mis-configuration), and proposes a mitigation plan. For example, the mitigation plan may be based on the newly introduced information collected below:

New event/notification to report mismatched S-NSSAI in signaling and data received by NFs.

New event/notification to report NF unexpected service request (e.g. registration, discovery) indicating the erroneous NF slice by NRF (dedicated or shared).

New event/notification to report unexpected communication (intention) between isolated slices by security functions.

New measurement for statistics of signaling/data error related to mis-matched S-NSSAI.

New configuration parameters in the management or core domain to support isolation policies.

New collected trace information on signaling plane.

New collected trace information on data plane.

It will also be understood that the examples may be implemented by a network data analytics function (NWDAF) or management data analytics function (MDAF or MDASP) or even across NWDAF and MDAF requiring cooperation and exchange of data. In particular, it will be noted that the present disclosure introduces:

A new analytics type (e.g. "Isolation Assurance") in NWDAF to analyze the notion of isolation related to events/notifications together with isolation policies and other configurations, then report the problem, and may trigger fast action, e.g. terminate PDU session.

New analytics type in MDAF (e.g. "Isolation Assurance") to analyze the isolation related events/notifications, measurements (PM, FM and KPIs) and trace data from NFs, SFs, cloud manager, together with the report from NWDAF, isolation policies and configuration, then report the isolation violation problem to operator/tenant and suggest a mitigation plan.

Some advantages of the disclosed concept include that it can detect not only disclosed/known slice error issues (as described in CVD-2021-0047 for example), but also other potential currently unknown protocol issues. For example, the concept can lead to detection of implementation or configuration errors, as well as malicious activities. Detected errors can then be reported, and a suitable remedial action can be triggered.

Figure 6:
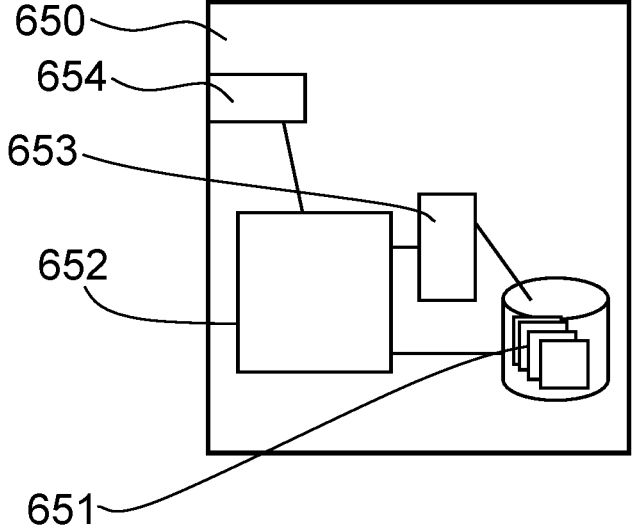
FIG. 6 schematically shows an apparatus which may be configured to carry out the method of the disclosure.

Functions of devices such as equipment of the access systems 20, 22, 24 or the accessing device 10, or equipment of the service developers and/or service providers and any of the network entities discussed herein can be provided by data processing apparatus. The data processing can be provided by apparatus comprising at least one processor and at least one memory. FIG. 6 shows an example of a data processing apparatus 650 comprising processor(s) 652, 653, and 654 and memory or memories 651. FIG. 6 further shows connections between the elements of the apparatus and an interface for connecting the data processing apparatus to other components of the device. The at least one memory may comprise at least one ROM and/or at least one RAM. The communications device may comprise other possible components for use in software and hardware aided execution of tasks it is designed to perform and implementing the herein described features. The at least one processor can be coupled to the at least one memory. The at least one processor may be configured to execute an appropriate software code to implement one or more of the following aspects. The software code may be stored in the at least one memory, for example in the at least one ROM.

The processing may be distributed between several processors. The processing may be provided by virtual data processing instances such as virtual machines or separated cores (containers) operated on a shared operating system resource. In this specification the term entity covers such virtual data processing instances.

Although the shown access networks are wireless, any other access types are valid. Similarly, the 5G core is only an example. Also, 5G core is specified to interwork with multiple types of wireline and wireless accesses.

Figure 7:
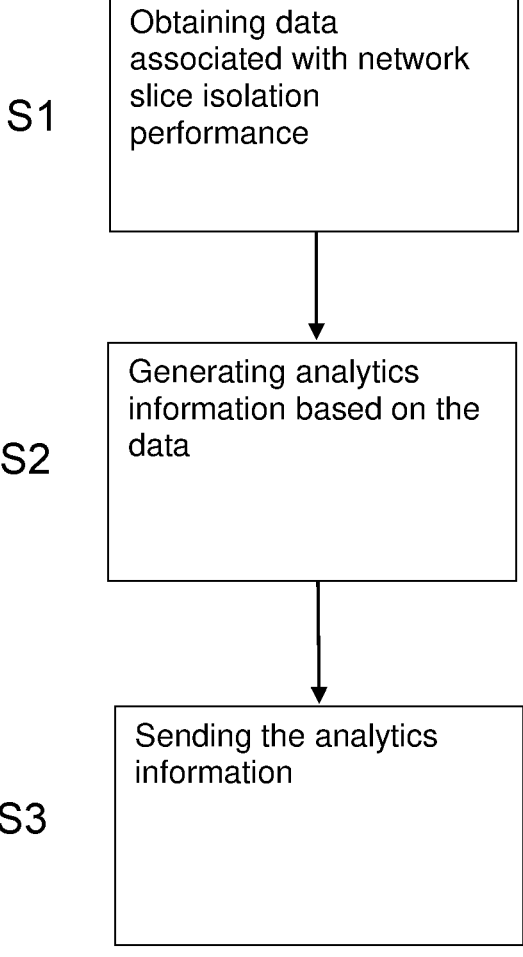
FIG. 7 schematically shows a method according to an example.

FIG. 7 schematically shows a method according to an example. According to some examples, the method is performed by an apparatus. For example, the apparatus may be comprised in a network entity. For example, the apparatus may comprise a network data analytics function. For example, the apparatus may comprise a management data analytics function.

As shown at S1, the method comprises obtaining data associated with network slice isolation performance.

As shown at S2, the method comprises generating analytics information based on the data.

As shown at S3, the method comprises sending the analytics information.

Figure 8:
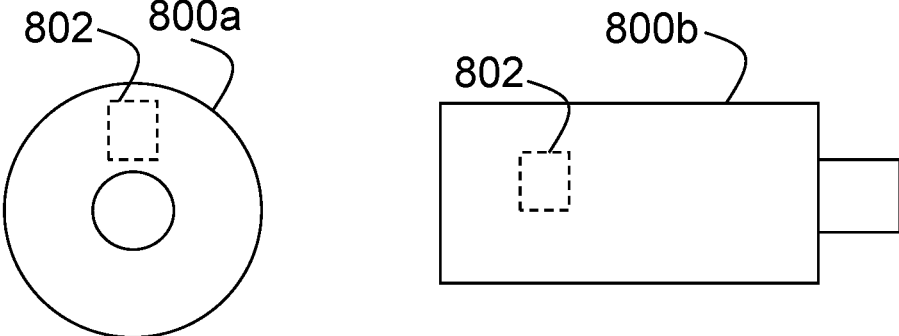
FIG. 8 schematically shows a representation of non-volatile memory media.

FIG. 8 shows a schematic representation of non-volatile memory media 800a (e.g. computer disc (CD) or digital versatile disc (DVD)) and 800b (e.g. universal serial bus (USB) memory stick) storing instructions and/or parameters 802 which when executed by a processor allow the processor to perform one or more of the steps of the method of FIG. 7.

The embodiments may vary within the scope of the claims. Various hardware and/or software components can provide the means necessary to implement the herein described principles. In general, some of the examples may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. At least a part of the functions can be provided in virtualised environment, and at least some of the entities can be provided as virtual computing instances. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally, some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause the communications device and/or device and/or server and/or or network entity to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, integrated device.

It is noted that whilst embodiments have been described in relation to certain architectures, similar principles can be applied to other systems. Therefore, although certain embodiments were described above by way of example with reference to certain exemplifying architectures for wireless networks, technology standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

What is claimed is:

1. An apparatus comprising a Management Data Analytics Function (MDAF), the apparatus further comprising:

at least one processor; and at least one memory storing instructions that, when executed by the at least one processor, cause the MDAF at least to perform:

based on a subscription for an isolation assurance report received from an analytics consumer, sending a request to a Network Data Analytics Function (NWDAF) to collect analytics related to network slice isolation, and obtaining a preliminary analytics report from the NWDAF as a data source;

based on at least one of the subscription or one or more alerts, raised by a first network function upon detecting an error comprising a mismatch of Single Network Slice Selection Assistance information (S-NSSAI) in a received message, requesting and obtaining data associated with network slice isolation performance from at least one core network domain source selected from a group consisting of a second network function comprising an Access and Mobility Management Function (AMF) or a Session Management Function (SMF), a network repository function (NRF), or a core network analytics function, and from at least one management domain source selected from a group consisting of a security function comprising a firewall (FW) or a management function, wherein the data comprises:

data of one or more errors from security logs or trace messages, wherein the errors comprise a control plane message for a first S-NSSAI being delivered to a network function dedicated to a second S-NSSAI, or a data plane packet for a first S-NSSAI being delivered to a user plane function dedicated to a second S-NSSAI;

performance measurements comprising:

a number of failed network function (NF) service register or discovery requests with incorrect Single Network Slice Selection Assistance information, a number of unauthorized access attempts with incorrect S-NSSAI, or a number of failed NF service discoveries due to an unauthorized NF Service consumer;

the isolation assurance report from the NWDAF;

network topology information;

configuration parameters related to isolation; and version or release information of one or more network functions;

correlating the data associated with network slice isolation performance with isolation policy information obtained from an isolation policy database;

generating analytics information of an Isolation Assurance analytics type based on the data and the correlation; and sending the analytics information to the analytics consumer, wherein the analytics information includes:

isolation policy violation statistics, information of probable cause of isolation policy violation, wherein the probable cause comprises a misconfiguration of a network function, a vulnerable software version of a network function, or a compromised network function, one or more recommended mitigation steps for mitigating future violation of the isolation policy, wherein the one or more recommended mitigation steps comprise enforcing isolation policies on a security gateway or firewall, isolating or terminating network function identified as malicious, reconfiguring a network function identified as impacted, or upgrading a network function identified as problem function, an identifier of a type of violation, performance statistics, performance prediction information, information of whether the analytics information pertains to a shared or dedicated resource, information of a target entity for sending the analytics information, geographical location information, information of one or more affected objects, wherein the one or more affected objects comprise a network slice, a network function, a Protocol Data Unit (PDU) session, or subscriber information, a start time of a performance problem, a stop time of the performance problem, or both the start and stop times of the performance problem, and a severity level of one or more performance problems.

2. The apparatus of claim 1, wherein generating the analytics information further comprises:

determining, based on the obtained version or release information of the first network function, that the probable cause is the vulnerable software version of the first network function.

3. The apparatus of claim 1, wherein the one or more recommended mitigation steps comprise recommending to upgrade the first network function in response to the information of probable cause of isolation policy violation identifying a vulnerable software version of the first network function.

4. The apparatus of claim 3, wherein the data associated with network slice isolation performance comprises a newly generated event or notification indicating detection of a mismatched Single Network Slice Selection Assistance information (S-NSSAI) in signaling or user plane data received by a network function.

5. The apparatus of claim 4, wherein the data further comprises an event generated by a network repository function (NRF) indicating an unexpected network function registration or service discovery request associated with an erroneous or unauthorized S-NSSAI.

6. The apparatus of claim 5, wherein the data further comprises an event generated by a security function indicating an attempted communication between network functions allocated to different isolated network slices in violation of an isolation policy.

7. The apparatus of claim 6, wherein correlating the data with isolation policy information further comprises obtaining slice association information for network function identifiers included in error logs and determining whether the network functions belong to different S-NSSAIs in violation of the isolation policy.

8. The apparatus of claim 7, wherein the data associated with network slice isolation performance comprises trace information collected from at least one of a signaling plane protocol or a data plane protocol, and wherein the trace information is analyzed to detect cross-slice message delivery.

9. The apparatus of claim 8, wherein generating the analytics information comprises combining a preliminary isolation analysis performed by the Network Data Analytics Function (NWDAF) in a core domain with end-to-end analytics performed by the Management Data Analytics Function (MDAF) across multiple management domains.

10. The apparatus of claim 9, wherein generating the analytics information further comprises triggering, during runtime, an automated mitigation action responsive to detection of an isolation policy violation.

11. The apparatus of claim 10, wherein correlating the data further comprises determining that a degradation in network slice performance metrics is associated with one or more detected S-NSSAI mismatches.

* * * * *